US012451271B2

(12) United States Patent
Robone et al.

(10) Patent No.: US 12,451,271 B2
(45) Date of Patent: Oct. 21, 2025

(54) MULTI-STATION MACHINE FOR PRODUCING HYBRID ELECTRICAL WIRING

(71) Applicant: TE Connectivity Italia Distribution S.r.l., Turin (IT)

(72) Inventors: Riccardo Francesco Robone, Turin (IT); Stefano Zuin, Turin (IT)

(73) Assignee: TE Connectivity Italia Distribution S.R.L., Turin (IT)

(*) Notice: Subject to any disclaimer, the term of this patent is extended or adjusted under 35 U.S.C. 154(b) by 628 days.

(21) Appl. No.: 17/533,482

(22) Filed: Nov. 23, 2021

(65) Prior Publication Data

US 2022/0223321 A1 Jul. 14, 2022

(30) Foreign Application Priority Data

Nov. 26, 2020 (IT) ........................ 102020000028505
Sep. 21, 2021 (IT) ........................ 102021000024221

(51) Int. Cl.
*H01B 13/00* (2006.01)
*H01R 43/048* (2006.01)
*H01R 43/05* (2006.01)

(52) U.S. Cl.
CPC ..... *H01B 13/0003* (2013.01); *H01B 13/0036* (2013.01); *H01R 43/0482* (2013.01); *H01R 43/05* (2013.01); *Y10T 29/49174* (2015.01)

(58) Field of Classification Search
CPC ............ H01B 13/0003; H01B 13/0036; Y10T 29/49174; H01R 43/0482; H01R 43/05; H01R 43/052; H01R 43/28
See application file for complete search history.

(56) References Cited

U.S. PATENT DOCUMENTS 4,669,162 A * 6/1987 Mihelich ................ H01R 43/05
29/748
4,683,636 A * 8/1987 Henderson ............. H01R 43/28
140/140
9,373,924 B2 6/2016 Fischer
(Continued)

FOREIGN PATENT DOCUMENTS

CN 103855590 A 6/2014
EP 1775804 B1 3/2013
(Continued)

OTHER PUBLICATIONS

Search Report from the European Patent Office dated Feb. 9, 2023, corresponding to Application No. 22216289.3-1201, 12 pages.
(Continued)

*Primary Examiner* — Minh N Trinh
(74) *Attorney, Agent, or Firm* — Barley Snyder

(57) ABSTRACT

A machine includes a first feeding station feeding at least one electrical wire, and a crimping station having at least one crimping tool. The machine further includes an insulation displacement connection (IDC) connection station, and a movable holding and transfer device having at least one actuator. The holding and transfer device receives an electrical wire from the first feeding station and transfers one or both ends of a first wire from the feeding station to one or both of the crimping station and the IDC connection station.

9 Claims, 11 Drawing Sheets

(56) References Cited

U.S. PATENT DOCUMENTS

| | | | | |
|---|---|---|---|---|
| 2008/0268697 | A1 | 10/2008 | Carlotto | |
| 2022/0223321 | A1* | 7/2022 | Robone | H01B 13/0003 |

FOREIGN PATENT DOCUMENTS

| | | | |
|---|---|---|---|
| EP | 2194619 | B1 | 1/2014 |
| EP | 2846420 | A1 | 3/2015 |
| WO | 2020170119 | A1 | 8/2022 |

OTHER PUBLICATIONS

Extended European Search Report, Application No. 21210365.9-1201, Dated Dec. 9, 2021, 14 pages.

Italian Written Opinion, App. No. 102020000028505, dated Aug. 11, 2021, 13 pages.

Chinese Office Action dated Apr. 29, 2025 with English translation, corresponding to Application No. 202111412758.2, 18 pages.

* cited by examiner

MULTI-STATION MACHINE FOR PRODUCING HYBRID ELECTRICAL WIRING

CROSS-REFERENCE TO RELATED APPLICATIONS

This application claims the benefit of Italian Patent Application Nos. 102020000028505 filed on Nov. 26, 2020 and 102021000024221 filed on Sep. 21, 2021, the whole disclosures of which are incorporated herein by reference in their entirety.

FIELD OF THE INVENTION

The present disclosure relates to electrical wiring, and more particularly, to a system for producing electrical wiring or associated harnesses.

BACKGROUND

In the field of electronics, insulation displacement connections (IDC), also referred to as IDC connections, are permanent electric connections between an electric wire and a terminal placed in a specific housing or connector made of plastic. During the step of inserting the electric wire inside the connector, the tabs of the terminal cut the insulation casing of the electric wire and establish the electric connection between the terminal and the wire.

In distinction, crimp connections are permanent electric connections between a wire and a terminal. This connection requires the clamping of the terminal on the electric wire through the crimper of the mold. Therefore, a preliminary operation that must to be performed before crimping of the wire is the removal of the insulation casing of the electric wire (stripping), so that the conductive component can be directly connected to the electric terminal. In this way, as the electric wire is blocked on the terminal through the crimper, a stable mechanical and electrical connection is assured. Often, a cable or wiring harness may require each connector type, further increasing the complexity of its assembly.

Current IDC and crimping processes are expensive, time consuming and often unreliable.

SUMMARY

A machine includes a first feeding station feeding at least one electrical wire, and a crimping station having at least one crimping tool. The machine further includes an insulation displacement connection (IDC) connection station, and a movable holding and transfer device having at least one actuator. The holding and transfer device receives an electrical wire from the first feeding station and transfers one or both ends of a first wire from the feeding station to one or both of the crimping station and the IDC connection station.

BRIEF DESCRIPTION OF THE DRAWINGS

The invention will now be described by way of example with reference to the accompanying Figures, of which.

DETAILED DESCRIPTION OF THE EMBODIMENTS

Figure 1:
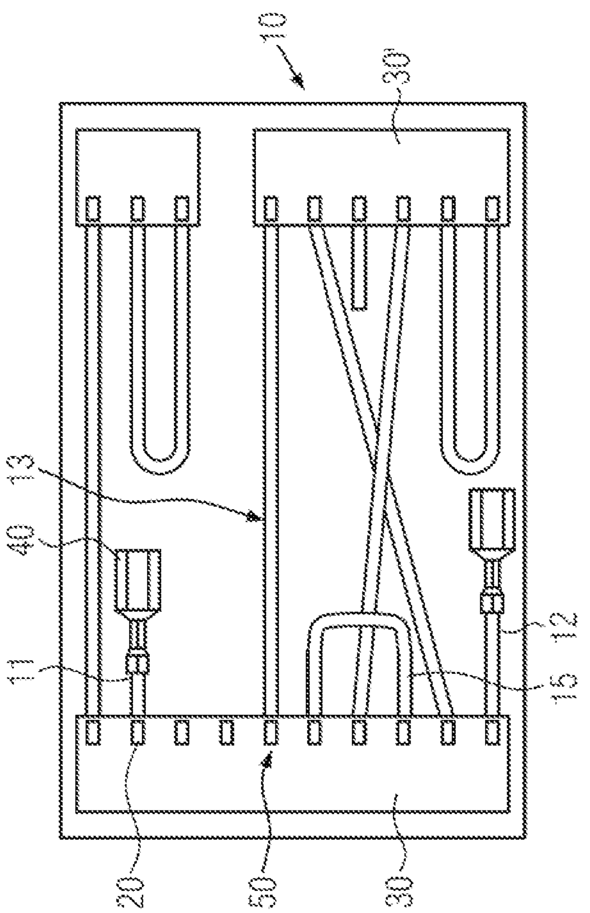
FIG. 1 schematically illustrates a two-dimensional view of an example of an electrical wiring structure of the type produced with the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 represents an example of an electrical wiring structure 10 of the type produced with the present invention. The electrical wiring structure 10 is intended simply as a non-limitative example of the electrical wiring structures produced by the present invention. The electrical wiring structure 10 comprises electrical wires 11, 12, 13, 15, each having two ends, respectively 11*a*, 11*b* and 12*a*, 12*b* and 13*a*, 13*b* and 15*a*, 15*b*. The ends 11*a* and 12*a* of the wires 11, 12 are terminated by crimp connectors 40, The ends 11*b* and 12*b* of wires 11, 12 are inserted in the corresponding receptacles 50 of the connector 30 provided with the corresponding electrical terminals 20. Both ends of the electrical wires 13 and 15 are terminated by IDC connectors. The ends 13*a* and 13*b* of the electrical wire 13 are inserted in the corresponding receptacles 50 of the two connectors 30, 30' provided with corresponding electrical terminals 20; the two connectors 30, 30' are placed one in front of each other. The two ends 15*a* and 15*b* of the electrical wire 15 are inserted in the corresponding receptacles 50 placed on the same connector 30 so that the electrical wire 15 is curved into a U-shape configuration.

Figure 2A:
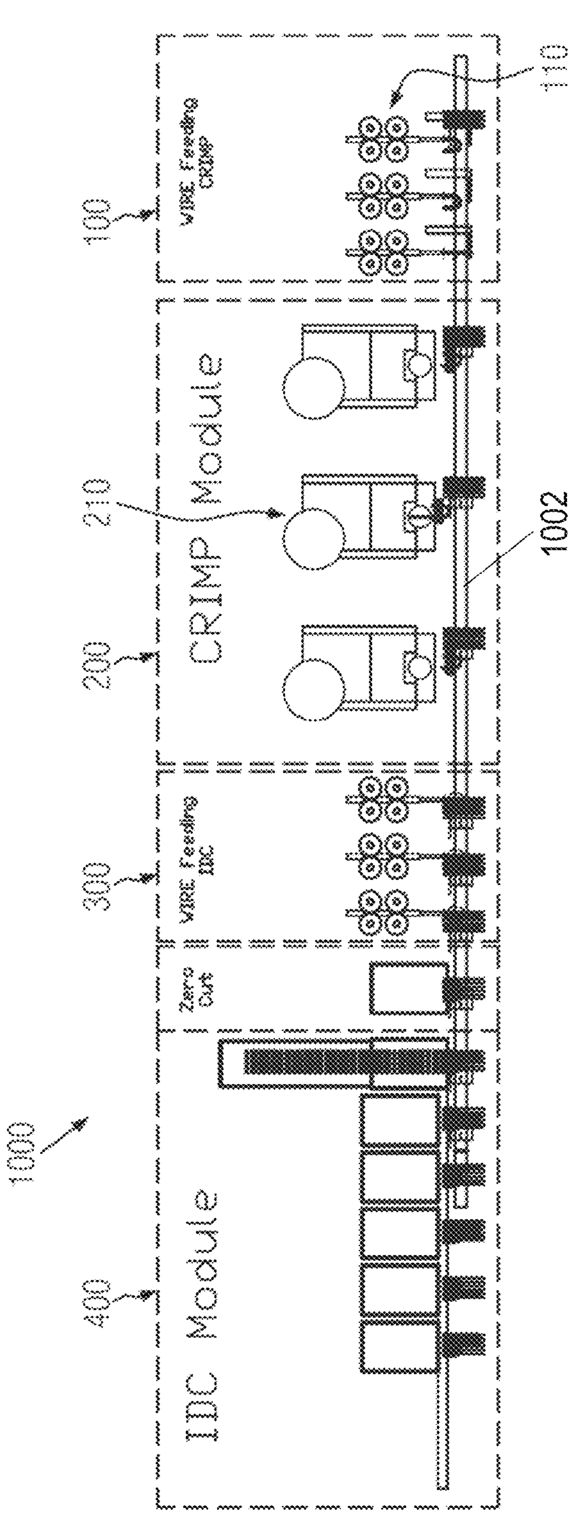
FIG. 2A schematically illustrates a machine for producing electrical wirings according to an embodiment of the present invention.

FIG. 2A schematically represents a machine 1000 for producing electrical wiring of the type constituted by at least two wires 11, 12, each comprising two ends, wherein one end of each wire is inserted in the corresponding receptacle 50 of a connector 30 provided with the corresponding electrical terminal 20 and the other end of each wire is connected to a crimped terminal 40. Preferably the machine 1000 produces electrical wiring structures 10 of the type illustrated in FIG. 1, further comprising electrical wires 13, 15 whose ends are both terminated by IDC connectors.

Figure 2B:
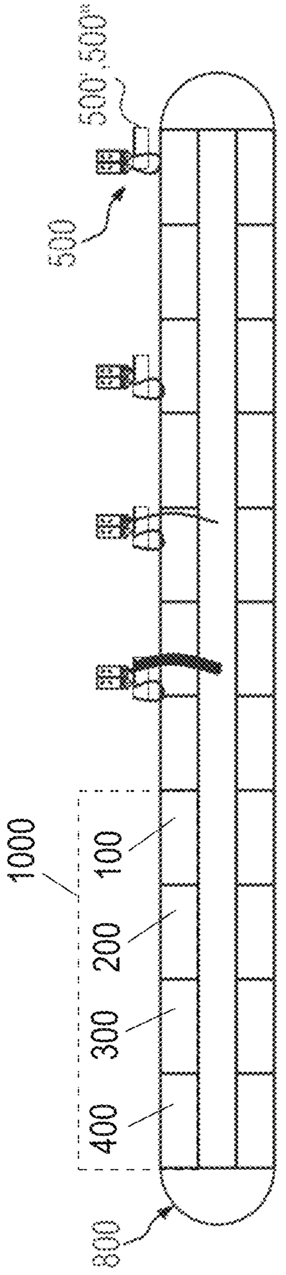
FIG. 2B schematically illustrates a closed loop including the machine of FIG. 2A.

The machine 1000 comprises four working stations positioned on a closed loop 800: a first feeding station 100, a crimping station 200, a second feeding station 300 and an IDC connection station 400. The machine 1000 uses a linear motor track 1002 (e.g., Beckhoff XTS or B&R Supertrack) for moving holding and transfer means 500, which are configured so as to hold and transfer electrical wires, through the different working stations 100, 200, 300, 400 on the closed loop 800, as shown in FIG. 2B. The holding and transfer means 500 comprise an independent mover which carries a transfer comb 500', 500", the transfer comb 500', 500" comprising a frame and seats designed so as to accommodate one end of an electrical wire. Each mover can be controlled independently, allowing maximum flexibility.

The first feeding station 100 comprises feeding means 110 to load electrical wires 11, 12 on the transfer comb 500', 500". For example, the feeding means 110 may comprise clamps for loading the electrical wires 11, 12 on the transfer comb. The electrical wires 11, 12 which are fed at the first feeding station 100 comprise one end 11*a*, 12*a* which is further terminated by crimp connectors at the crimping station 200.

The first feeding station 100 comprises three units of feeding means 110 that can work simultaneously. For example, the first feeding station 100 may comprise any number of units of feeding means 110, for example one, two, four, five or more.

The crimping station 200 comprises three crimping machines of the type of crimping presses to process different electrical wires simultaneously. For example, crimping is performed by inserting the stripped end of a wire into a portion of a terminal which is then mechanically deformed by compressing it tightly around the wire and each crimping press is configured so as to crimp a particular shape of crimp connectors. Preferably, the crimping station 200 does not comprise stripping means since the electrical wires have already been stripped at the first feeding station 100. For example, the crimping station 200 may comprise any number of crimping presses, for example one, two, four, five or more. Preferably, the crimping station 200 comprises as many crimping presses as the number of feeding units comprised in the first feeding station 100.

The second feeding station 300 is configured so as to feed electrical wires 13, 15 whose ends 13*a*, 13*b*, 15*a*, 15*b* need to be terminated by IDC connectors. The second feeding station 300 comprises bending means 310 to bend the electrical wires 13, 15 into a U-shaped configuration, so that both ends of each electrical wire 13, 15 are accommodated into the seats of the transfer comb 500', 500". The electrical wires are more easily transferred through the different working stations if they are held in a U-shaped configuration as both ends are made directly available to processing means.

The IDC connection station 400 comprises a plurality of machines to terminate by IDC connectors electrical wires which have been fed at the first feeding station 100 and at the second feeding station 300, The IDC connection station 400 may realize different hybrid electrical wiring structures 10, of the type represented in FIG. 1. The IDC connection station 400 further comprises trimming means 410 to trim the electrical wires 11, 12, 13, 15 before they are terminated by IDC connectors so that they have exactly the predefined length to match within the electrical connectors 30, 30'.

FIGS. 3A to 3D schematically show the feeding operations of an electrical wire at the first feeding station 100, according to a first illustrative embodiment of the present invention. The first feeding station 100 comprises feeding means 110 to load electrical wires 11, 12 on the transfer comb 500', 500". The feeding means 110 according to the first illustrative embodiment are combined with stripping means 120, which are placed in front of the feeding means 110 (see FIG. 3A). In this way, the end of the electrical wires 11, 12 which must be crimped is first fed to the feeding means 110 and then to the stripping means 120, so that the insulation casing is immediately removed during feeding operations. The stripping of the electrical wires 11, 12 is performed by holding one end of the electrical wires 11, 12 in the stripping means 120 and by pulling the wire 11, 12 backwards (see FIG. 3A and FIG. 6).

Figure 3A:
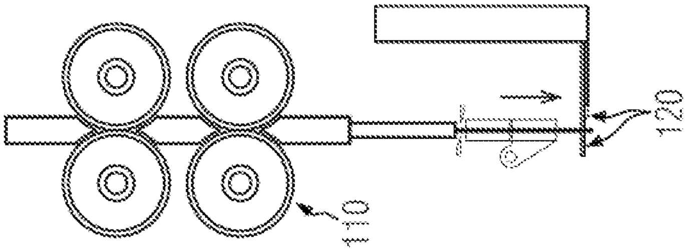
FIGS. 3A to 3D schematically illustrate the feeding operations of an electrical wire at the first feeding station 100 according to a first illustrative embodiment of the present invention.
Figure 3B:
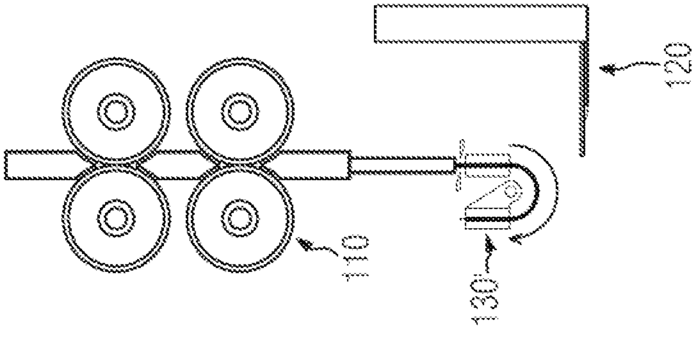

The first feeding station 100 further comprises rotating clamps 130' which bend the electrical wire 11, 12 into a U-shaped configuration before providing it to the holder comb, so that the two ends of each wire 11*a*, 11*b* and 12*a*, 12*b* can be accommodated into the corresponding seats of the holder comb 500', 500" (see FIG. 3B). For example, the rotating clamps 130' may comprise pneumatic grippers.

Figure 3C:
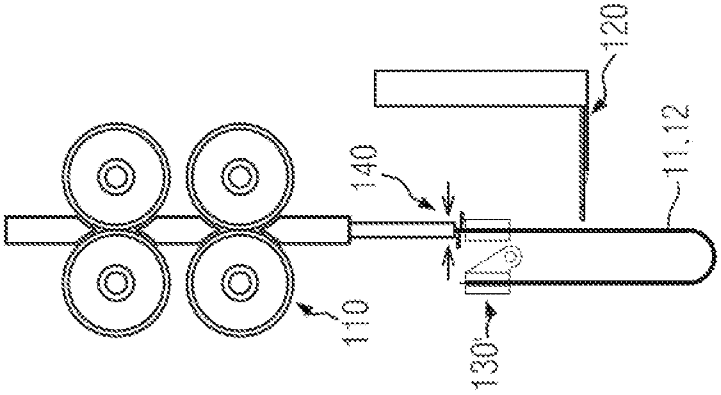

The first feeding station 100 further comprises cutting means 140 to cut the fed wire at the required length L by means of cutting blades (see FIG. 3C). For example, L can be comprised between 100 mm and 1500 mm for electric wires comprising one end to be crimped and one end to be connected to an IDC terminal; more preferably L can be comprised between 150 mm and 1500 mm. L can be comprised between 100 mm and 3000 mm for electrical wires comprising two ends that need to be connected to IDC terminals; more preferably L can be comprised between 150 mm and 3000 mm.

Figure 3D:
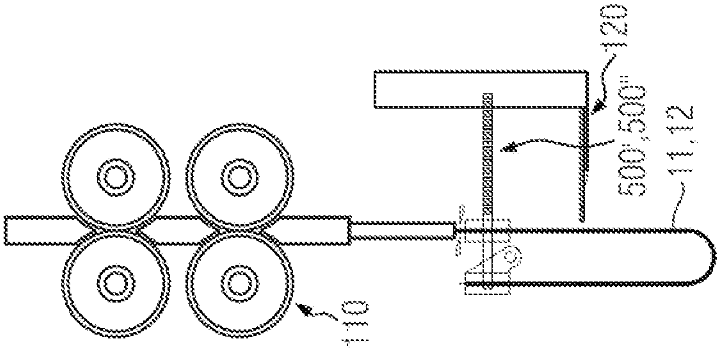
Figures 4A, 4B, 4C, 4D:
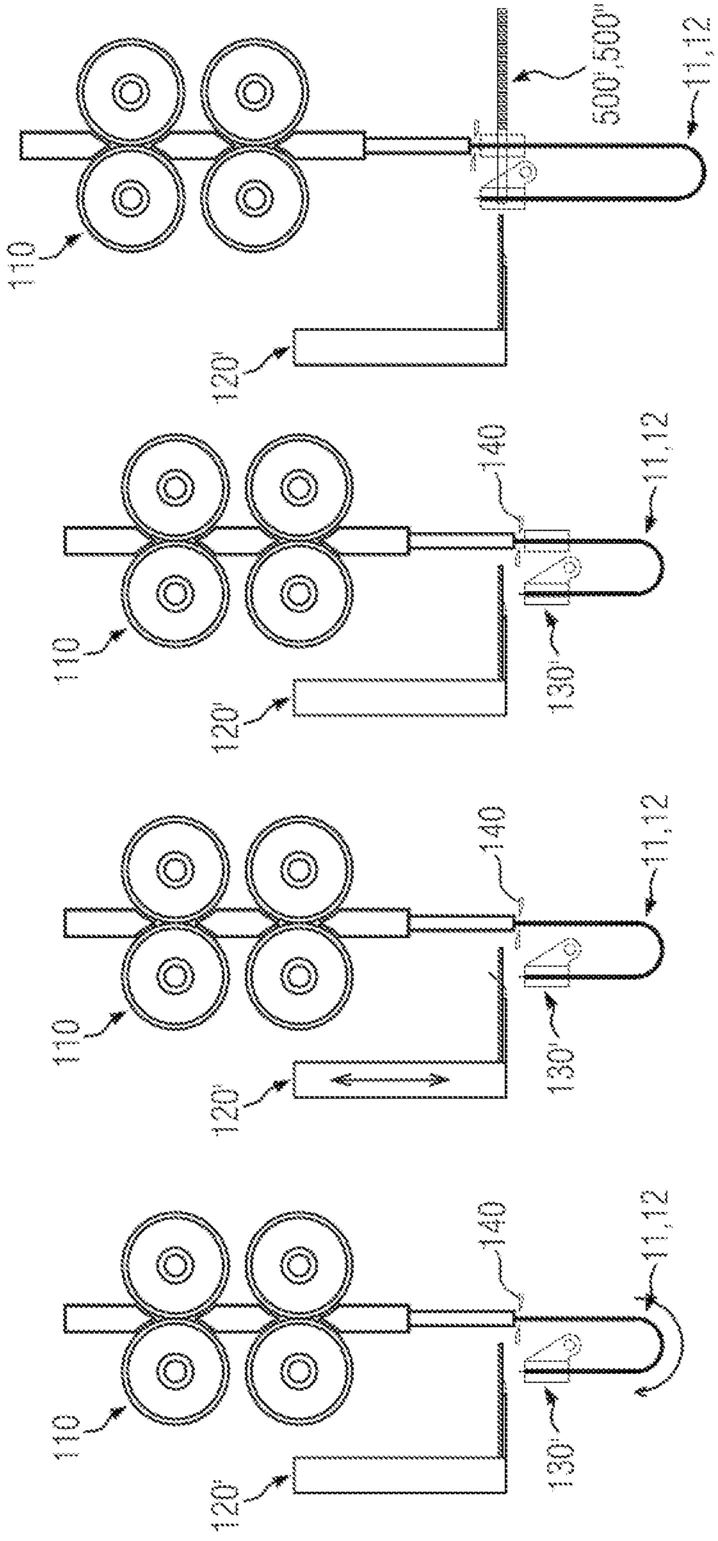
FIGS. 4A to 4D schematically illustrate the feeding operations of an electrical wire at the first feeding station 100 according to a second illustrative embodiment of the present invention FIG. 5 schematically illustrates a transfer comb for holding and transferring electrical wires according to a first embodiment of the present invention.

The feeding means 110 feeds the stripped and cut electrical wires 11, 12 to the transfer comb 500', 500" positioned in front of them (see FIG. 3D). For example, the feeding means 110 may comprise clamps for loading the electrical wires 11, 12 on the transfer comb 500' 500".

FIGS. 4A to 4D schematically show the feeding operations of an electrical wire at the first feeding station 100, according to a second illustrative embodiment of the present invention. The first feeding station 100 according to the second illustrative embodiment differs from the first feeding station 100 according to the first illustrative embodiment for the configuration of the stripping means 120'. In the second illustrative embodiment, the stripping means 120' are adjacent to the feeding means 110 and are movable. The electrical wire 11, 12 is first fed to the feeding means 110 and then is bent into a U-shaped configuration by the rotating clamps 130' (see FIG. 4A). In the U-shaped configuration, one end of the electrical wire 11, 12 is held by the feeding means 110 and the other end reaches the stripping means 120'. The stripping means 120' are then displaced so as to strip and remove the insulation case of the end of the wire (see FIG. 4B and FIG. 7). The first feeding station according to the second illustrative embodiment is further configured to cut the fed wire at the required length L by means of cutting blades (see FIG. 4C) and to provide it to the transfer comb 500', 500", as in the first illustrative embodiment (see FIG. 4D).

Figure 5:
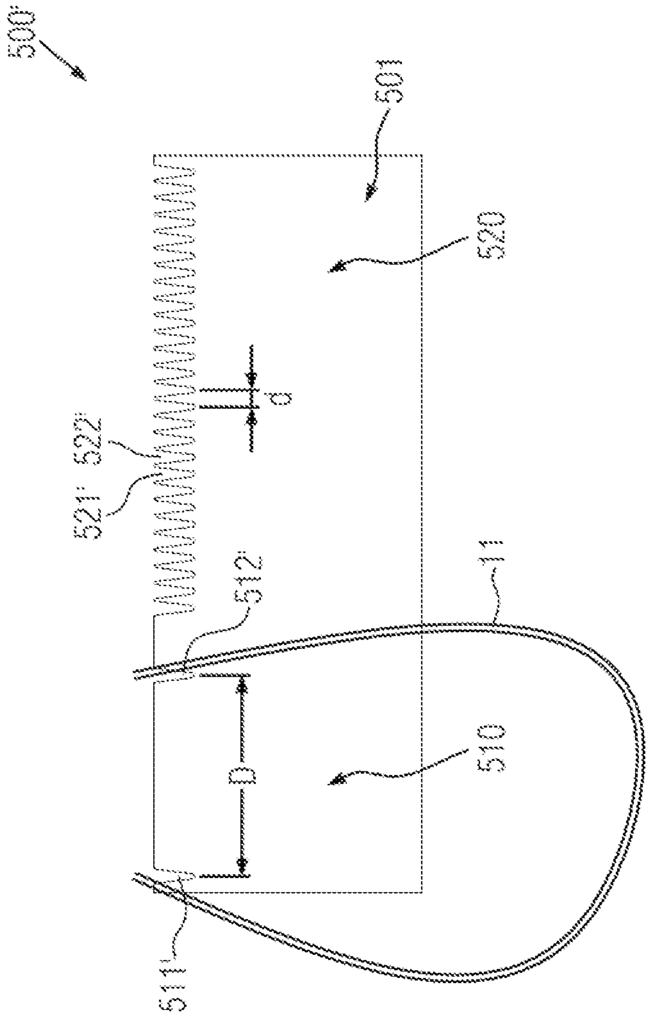

FIG. 5 shows an asymmetric holder comb 500' according to a first embodiment of the present invention. The asymmetric holder comb 500' comprises a frame 501 on which seats 511', 512', 521', 522' are formed according to a substantially horizontal orientation. Each seat 511', 512', 521', 522' is substantially V-shaped to accommodate from above the corresponding wires 11, 12, 13, 15.

The asymmetric holder comb 500' presents an asymmetric design and it comprises a temporary storage area 510 and a permanent storage area 520. The temporary storage area 510 comprises two seats 511', 512' placed at a first distance D. The permanent storage area 520 comprises a plurality of seats 521', 522', for instance twenty-one teeth or more, which are placed at a second distance d. The first distance D is greater than the second distance d and it is designed so as to correspond to the distance between the two ends of an electrical wire bent in a U-shape configuration. The temporary storage area 510 is designed so as to accommodate wires 11, 12 comprising one end to be crimped, while the permanent storage area 520 is designed so as to accommodate wires that have already been crimped and additional wires comprising two ends to be terminated by IDC connectors.

Figure 6:
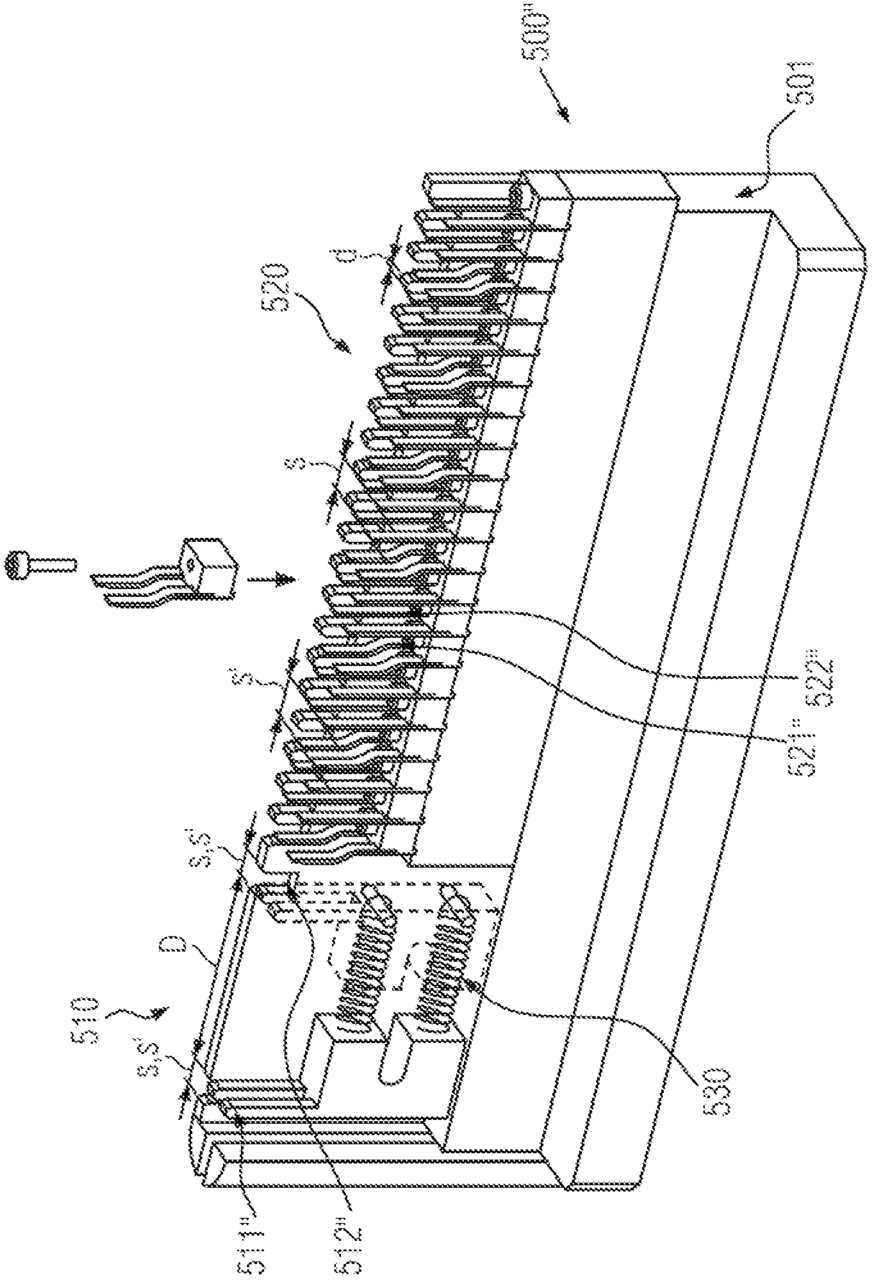
FIG. 6 schematically illustrates a transfer comb for holding and transferring electrical wires according to a second embodiment of the present invention.

FIG. 6 shows an asymmetric holder comb 500" according to a second embodiment of the present invention. The asymmetric holder comb 500" comprises a frame 501 on which seats 511", 512", 521", 522" are formed according to a substantially horizontal orientation. Each seat 511", 512", 521", 522" is substantially V-shaped to accommodate from above the corresponding wires 11, 12, 13, 15.

The asymmetric holder comb 500" presents an asymmetric design and it comprises a temporary storage area 510 and a permanent storage area 520. The temporary storage area 510 comprises two seats 511", 512" placed at a first distance D, wherein each seat 511", 512" is delimited by a corresponding pair of teeth and has a variable width s, s'. The temporary storage area 510 is provided with elastic means 530, for example a helical traction spring, which are configured to dynamically adjust the distance between each pair of teeth delimiting each seat 511", 512" and thus to dynamically adjust the width of each seat 511", 512". In this way, as result of the elasticity of the helical traction spring, electrical wires having different sections may be accommodated and held in the seats 511", 512", without the risk of deforming and/or damaging the teeth.

The permanent storage area 520 comprises a plurality of seats 521", 522", for instance twenty-one teeth or more, which are placed at a second distance d, wherein each seat 521", 522" is delimited by a pair of teeth. The seats 521", 522" may have predefined different widths s, s', i.e. each seat 521", 522" may be delimited by a pair of teeth placed at a predefined different distance s, s', in order to accommodate and hold electrical wires having different sections. Preferably, each seat 521", 522" may be fixed by means of screws and it may be added or removed from the permanent storage area 520 according to the user's needs, that is depending on the number of wires having a predefined section corresponding to the predefined seat width s, s' that must be held in the holder comb 500". In this way, electrical wires having different sections may be accommodated and held in the seats 521", 522", without the risk of deforming and/or damaging the teeth.

For instance, the asymmetric holder comb 500" according to this configuration may accommodate and hold into the seats 511", 512", 521", 522" electrical wires having a section of 0.35 $mm^2$ and/or of 1.5 $mm^2$. However, it is clear that also electrical wires having sections smaller than 0.35 $mm^2$, or sections larger than 1.5 $mm^2$, or any other section may be accommodated and held in the holder comb 500" according to the present invention.

Each asymmetric holder comb 500', 500" is placed on a mover that can be controlled independently and that transfers it through the different working stations 100, 200, 300, 400 of the machine 1000. The movers are functionally controlled by electronic means. During the crimping operations, the comb 500', 500" is constantly moved between the first feeding station 100 and the crimping station 200. The asymmetric design of the transfer comb 500', 500" provides a significant advantage in conjunction with the independent controls provided by the linear motor transfer system, since, during each translation moment, two operations can be carried out, i.e. the feeding of the uncrimped electrical wires and the collection of the crimped ones.

Figure 7:
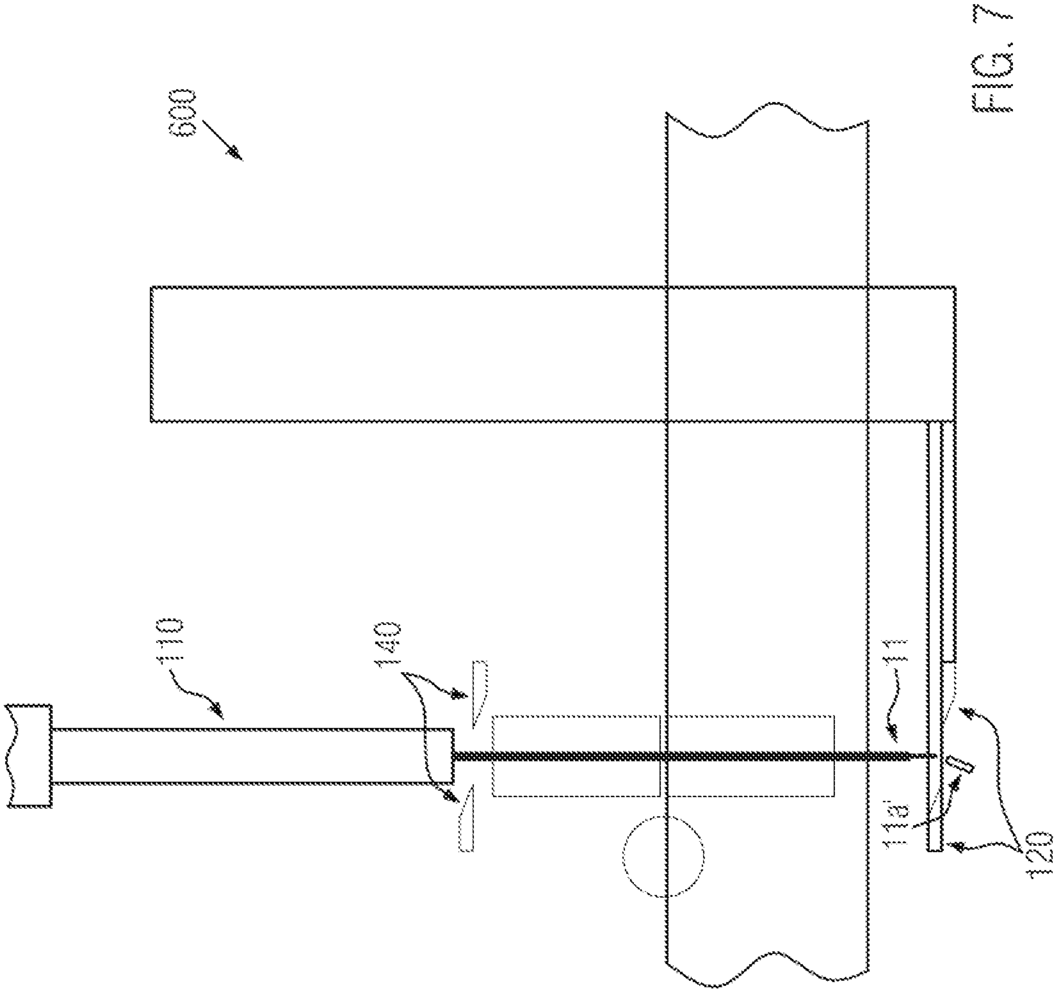
FIG. 7 schematically illustrates stripping means for stripping the insulation casing of electrical wires according to a first illustrative embodiment of the present invention.

FIG. 7 shows stripping means 120 according to a first illustrative embodiment of the present invention. The stripping means 120 comprise stripping blades that are positioned in front of the feeding means 110, so that when one end 11*a* of the electrical wire 11 exits the feeding means 110, it reaches the stripping blades and passes through them; when the electrical wire 11 is pulled backwards, the insulation casing 11*a'* on that end 11*a* is removed. In this way, the insulating casing 11*a'* of the electrical wire 11 is removed by the stripping blades 120, while the electrical wire 11 is fed to the feeding means 110 at the first feeding station 100 and it is immediately prepared for further crimping operations, thus reducing processing times.

Figure 8:
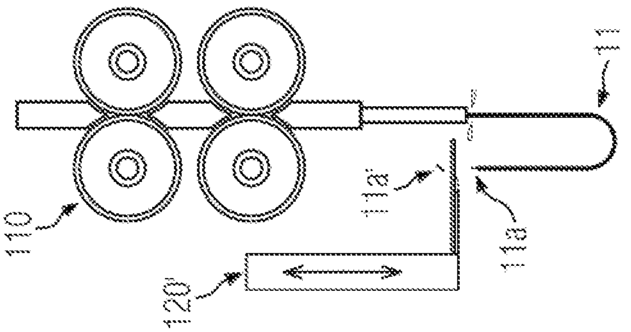
FIG. 8 schematically illustrates stripping means for stripping the insulation casing of electrical wires according to a second illustrative embodiment of the present invention.

FIG. 8 shows stripping means 120' according to a second illustrative embodiment of the present invention. The stripping means 120' comprise stripping blades and they are located adjacent to the feeding means 110. The electrical wire 11 exits the feeding means 110 and is bent in a U-shaped configuration by the rotating clamps 130'. One end 11*a* of the electrical wire 11 in the U-shaped configuration reaches the stripping blades; when the stripping blades are displaced, the insulation casing 11*a'* on that end 11*a* is removed. In this way, the insulating casing 11*a'* of the electrical wire 11 is removed by the stripping blades 120' at the first feeding station 100 and it is immediately prepared for further crimping operations, thus reducing processing times. Preferably, the electrical wire 11 has been previously cut to the desired length by means of cutting means 140.

Figure 9A:
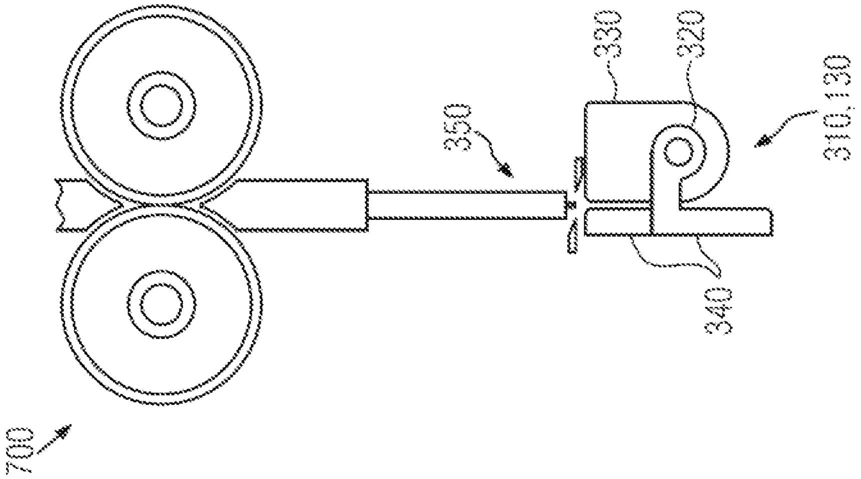
FIGS. 9A to 9C schematically illustrate three steps of the process of curving an electrical wire into a U-shape configuration by means of bending means according to an embodiment of the present invention.
Figure 9B:
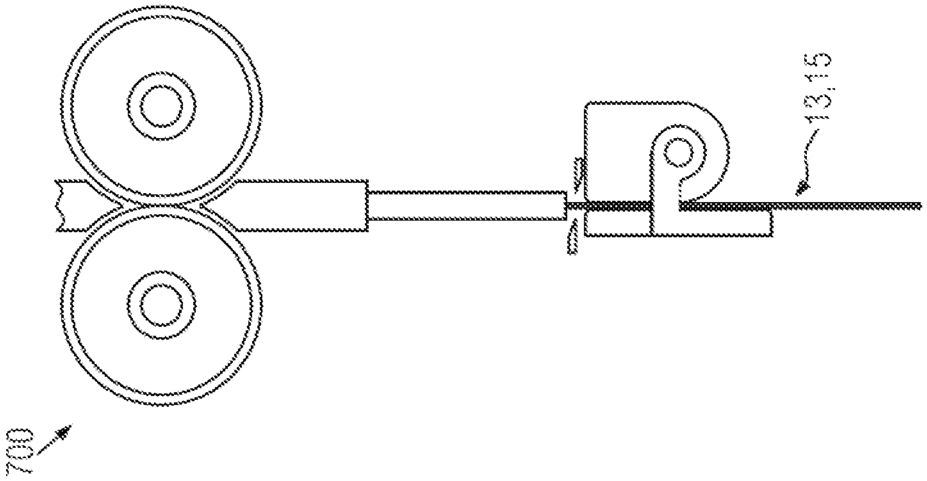
Figure 9C:
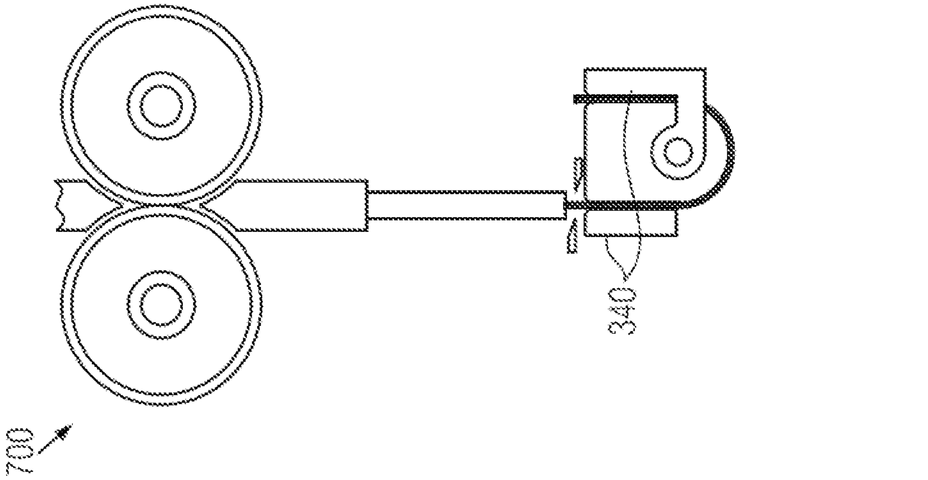

FIGS. 9A to 9C represent the bending means 310 according to a preferred embodiment of the present invention, comprising a pivot 320, a semi-circular jig 330 and guiding means 340. The guiding means 340 are rotatable around the pivot 320 and they are pivotally mounted on the semi-circular jig 330, which is coaxial with the pivot 320. The guiding means 340 are configured so as to initially receive (see FIG. 9A) and accommodate (see FIG. 9B) a section of the electrical wire to be curved, and to bend it around the semi-circular jig 330. The electrical wire hence assumes a U-shaped configuration around the semi-circular jig 330 (see FIG. 9C). For example, the bending means 310 are configured to bend wires having a length of 100 mm. The bending means 310 are combined with the feeding means 350 at the second feeding station 300 so that the electrical wire 13 is first bent into a U-shape configuration by bending means 310 and then the two ends are positioned within corresponding seats in the asymmetric holder comb 500', 500".

Figure 10:
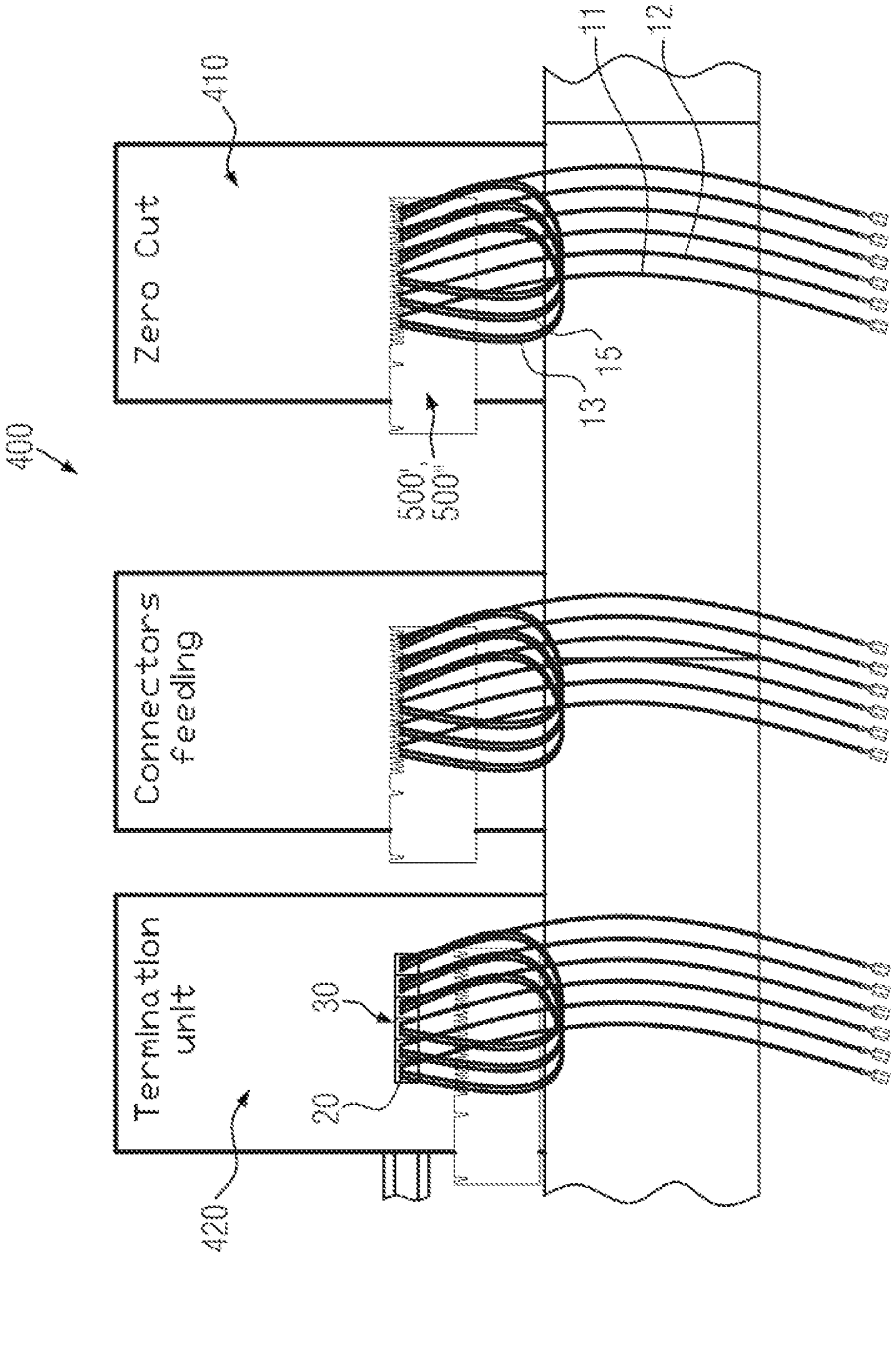
FIG. 10 schematically illustrates an IDC connection station for terminating electrical wires by IDC connectors according to an embodiment of the present invention.

FIG. 10 represents an IDC connection station 400 according to a preferred embodiment of the present invention. The IDC connection station 400 may be similar to existing IDC connection stations and it includes a mass termination unit 420 for simultaneously connecting all the electrical wires 11, 12, 13, 15 held by the asymmetric holder comb 500', 500" to the corresponding electrical terminals 20 of a connector 30. The IDC connection machine further includes a checking unit and cover-closing unit. The IDC connection station 400 further comprises a trimming station 410 to trim the electrical wires 11, 12, 13, 15 so that they have exactly the same length before they are inserted into the receptacles of the connector 30 having corresponding terminals 20. In fact, the asymmetric holder comb 500', 500" which reaches the IDC connection station 400 typically comprises different electrical wires not necessarily having exactly the same length.

In the following, the operation of a preferred embodiment according to the present invention is described with reference to FIGS. 11A to 11G. The holding and transfer means 500 comprise the asymmetric holder comb 500', 500". Initially, the asymmetric holder comb 500', 500" is positioned in front of the feeding means 110 at the first feeding station 100 (see FIG. 11A). The first feeding station may be of the known type, for example, it is of the type Flexible Harness Maker (FHM). The first electrical wire 11 is inserted automatically into the feeding means 110 at the first feeding station 100 and, when it exits, it is forced to pass through the stripping blades 120, 120' so that the insulation casing of the end 11*a* is removed.

According to the first illustrative embodiment described above and shown in FIGS. 11A to 11G, the stripping blades 120 may be placed in front of the feeding means 110. In the first illustrative embodiment, the first electrical wire 11, after being stripped by the stripping blades 120, is bent into a U-shape configuration by bending means 130, while one end of the wire is still held by the feeding means 110, and the first electrical wire 11 is finally loaded on the temporary storage area 510 of the asymmetric holder comb 500', 500". In fact, the distance D between the two seats 511', 512', 511", 512" of the temporary storage area 510 is designed so as to match the distance between the two ends 11*a*, 11*b* of the electrical wire 11 curved into a U-shaped configuration.

According to the second illustrative embodiment described above but not shown in FIGS. 11A to 116, the stripping blades 120' may be adjacent to the feeding means 110 and it may be necessary to bend the wire 11 by means of the bending means 130, before feeding it to the stripping blades 120'. In the second illustrative embodiment, the electric wire 11 is first bent into a U-shaped configuration, it is then stripped by displacing the stripping blades 120' and finally loaded on the temporary storage area 510 of the asymmetric holder comb 500', 500".

Preferably, the seats 511', 512', 511", 512" of the temporary storage area 510 may have a variable width that can be adjusted according to the section of the electrical wire 11 received at the first feeding station 100. Preferably, the variable width is adjusted by means of elastic means, for instance a helical traction spring.

The first electrical wire 11 may be further cut at a predefined length by cutting means at the first feeding station 100 according to the first or second illustrative embodiments.

The asymmetric holder comb 500', 500" carrying the first electrical wire 11 is moved to the crimping station 200 (see FIG. 11B) and the first electrical wire 11 is gripped by clamps and transferred to crimping press 210 for terminating the end 11*a* by crimp connectors 40.

Figure 11A:
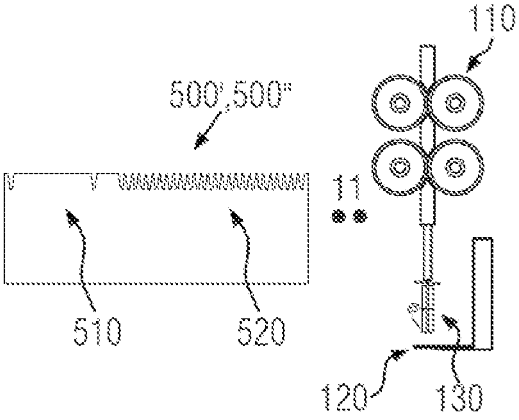
FIG. 11A to 11G schematically illustrate the steps of the method for transferring electrical wires from a first feeding station to a crimping station according to an embodiment of the present invention.
Figure 11B:
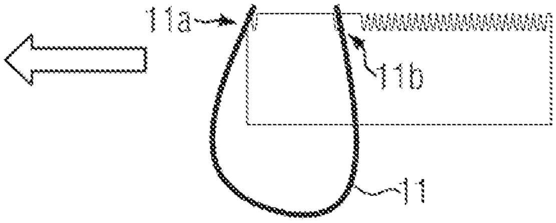
Figure 11C:
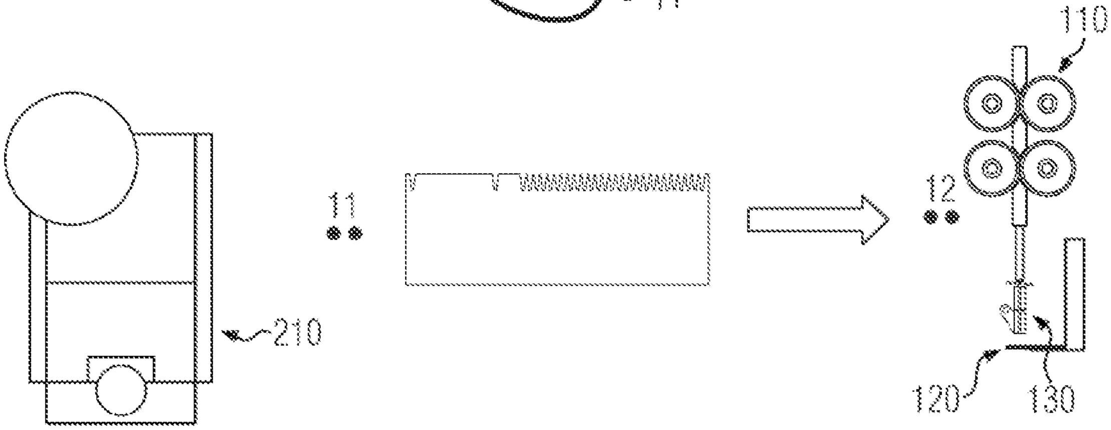
Figure 11D:
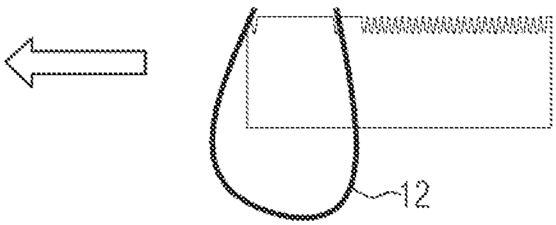
Figure 11E:
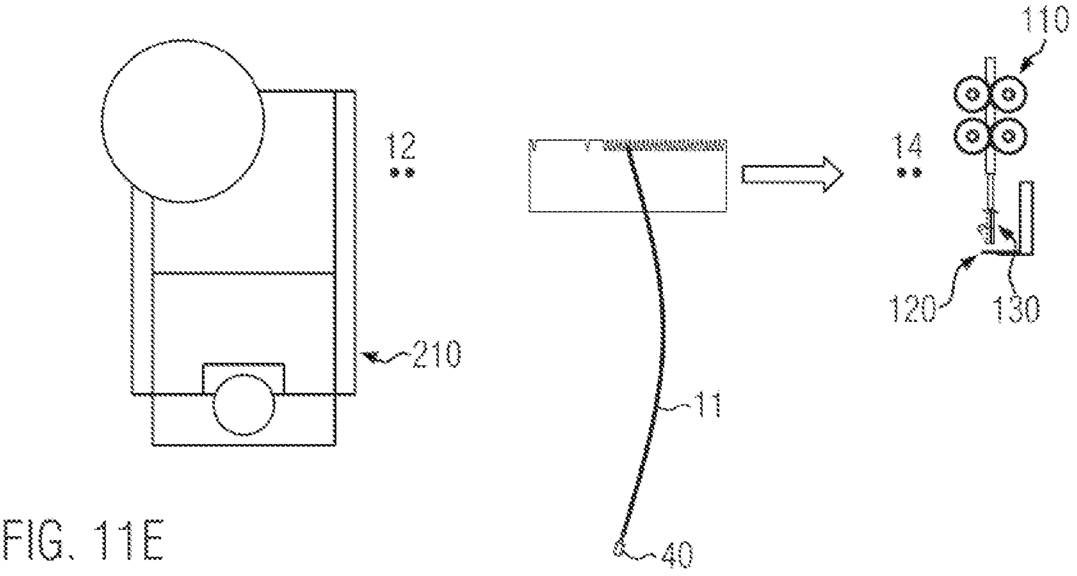
Figure 11F:
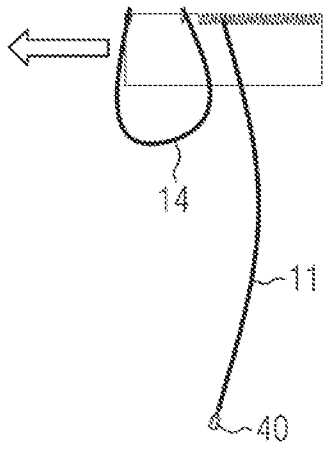

During crimping of the first wire 11, the asymmetric holder comb 500', 500" is moved back to the first feeding station 100 to receive a second electrical wire 12 (see FIG. 11C) and then moved again to the crimping station 200 (see FIG. 11D). During the movement from the crimping station 200 to the first feeding station 100, the temporary storage area 510 is left empty. The permanent storage area 520 is empty only during the first cycle of movement from the first feeding station 100 to the crimping station 200 and backwards, while during further cycles it is fed with the crimped wires. In this way, the crimping cycle is optimized because the operations of crimping the first wire 11 and of feeding and transferring the second wire 12 to the crimping station 200 are carried out simultaneously.

At the crimping station 200, the first crimped electrical wire 11 is released from the crimping clamps and positioned in the permanent storage area 520 of the asymmetric holder comb 500', 500". Preferably, the seats 521', 522', 521", 522" of the permanent storage area 520 may have predefined different widths s, s' for accommodating corresponding electrical wires having predefined different sections. For example, the electrical wire 11 may be accommodated on a seat 521', 522', 521", 522" of the permanent storage area 520 having a width corresponding to its section.

Afterwards, the crimping clamps collect the second electrical wire 12 from the asymmetric holder comb 500', 500". The first crimped electrical wire 11 is loaded into the permanent storage area 520 so that the uncrimped end 11*b* is positioned inside an empty seat 521', 521" and the crimped end 11*a*, comprising the crimp connector 50, is hanging down from the asymmetric holder comb 500', 500". During crimping of the second electrical wire 12, the asymmetric holder comb 500', 500" carrying the first crimped wire 11 is moved back to the first feeding station 100 to receive a third electrical wire 14 (see FIG. 11E) and then it is moved again to the crimping station 200 carrying the first crimped wire 11 in the permanent storage area 520 and the third electrical wire 14 in the temporary storage area 510 (see FIG. 11F).

At the crimping station 200, the second crimped electrical wire 12 is released by the crimping clamps and positioned in the permanent storage area 520 of the asymmetric holder comb 500', 500" together with the first crimped wire 11. Preferably, the electrical wire 12 may be accommodated on a seat 521', 522', 521", 522" of the permanent storage area 520 having a width corresponding to its section.

Figure 11G:
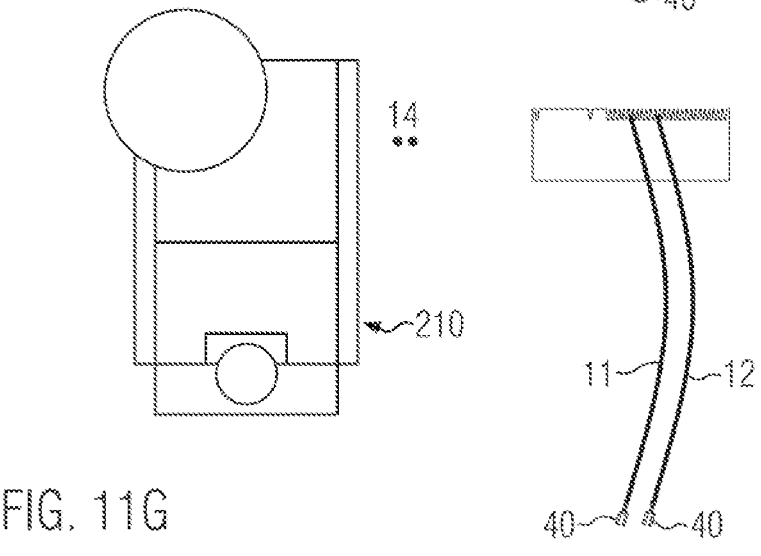

Afterwards, crimping clamps collect the third electrical wire 14 from the asymmetric holder comb 500', 500" (see FIG. 11G).

These operations can be repeated for a number of times so as to load a plurality of electrical wires into the temporary storage area 510 of the asymmetric holder comb 500' at the first feeding station 100 and to transfer them to the crimping station 200.

These operations are carried out so that, while a previous wire is being crimped at the crimping station 200, a new wire is loaded into the temporary storage area 510 and transferred to the crimping station 200 and then, before the new wire is collected by crimping clamps, the previous wire is released and loaded on the permanent storage area 520 together with the other crimped wires. During these transfer movements, the electrical wires which have already been crimped are all stored into the permanent storage area 520.

The asymmetric holder comb 500', 500" storing a plurality of crimped electrical wires in the permanent storage area 520 is then moved to the second feeding station 300. At the second feeding station 300, the asymmetric holder comb 500', 500" stops and receives at least one additional electrical wire 13 comprising two ends to be terminated by IDC connectors. For example, at the second feeding station 300, a plurality of additional electrical wires 13, 15 is loaded into the permanent storage area 520 of the asymmetric holder comb 500', 500" which also stores the crimped electrical wires 11, 12, 14.

At the second feeding station 300, the additional electrical wires 13, 15 are bent into a U-shaped configuration by bending means 310. The additional electrical wires 13, 15 are initially partially accommodated into guiding means 340 and are bend around the semi-circular jig 330. The additional electrical wires 13, 15 hence assume a U-shaped configuration around the semi-circular jig 330 and are directly loaded into the permanent storage area 520 so that the two ends are accommodated into different seats of the permanent storage area 520. In this way, both ends of the electrical wires are made easily available to the processing means of the IDC connection station 400.

Finally, the asymmetric transfer comb 500', 500" is transferred to the IDC connection station 400. The IDC connection machine 420 may be of the known type and it is configured so as to insert the electrical wires 11, 12, 13, 14, 15 in corresponding receptacles 50 of a connector 30 or of different connectors 30, 30' provided with at least one corresponding electrical terminal 20. The IDC connection station 400 further comprises a trimming station 410 where the ends of the wires are all trimmed at the same distance from the asymmetric holder comb 500', 500" in order to have identical lengths of insertion in the connectors. Once the wires 11, 12, 13, 15 have been trimmed, the asymmetric holder comb 500', 500" is moved toward the insertion region, where there can be one or more connectors and the wires are inserted into corresponding electrical terminals.

The machine according to the invention allows producing in a completely automated manner hybrid electrical wirings structures. For example, the electrical wires can have both ends inserted into corresponding receptacles 50 of one or more connectors 30, 30' provided with corresponding electrical terminals 20, or the electrical wires can have one end terminated by crimp connectors 40 and one end terminated by IDC connectors. Therefore, of course, the machines and components described herein should be understood to be performing under the control of more or more computers and associated memory devices, for example located within the illustrated machine 1000. More specifically, each of the modules shown in FIG. 1, as well as others described herein) may comprise their own processing units (processors, memory devices, and the like).

While the invention has been described with respect to the preferred physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

For instance, even if it is described that two or more wires are collected at the first feeding station 100 and one or more wires are collected at the second feeding station 300, it is clear that the machine could also be worked in such a way that a single wire is collected at the first feeding station, that one end of that wire is crimped at the crimping station 200, without the asymmetric holder comb 500', 500" moving back to the first feeding station 100 to collect a second wire, and then the other end of the first wire is connected to an IDC terminal at the IDC connection station 400. Moreover, the machine could also be worked in such a way that no wires are collected at the first feeding station 100 and that one or more wires are collected at the second feeding station 300 for IDC connection.

For instance, even if the structure and the functioning of the bending means 310 have been described with reference to the second feeding station 300, it is evident that the same principles may also apply to the bending means 130 at the first feeding station 100.

Moreover, even if the bending means 130, 310 and the stripping means 120 have been shown and described separately, it is clear that they can be combined at the first feeding station 100. For example, according to an illustrative embodiment, the electrical wires 11, 12 which are fed at the first feeding station 100, may be first inserted into the feeding means 110, then may pass through the stripping blades 120 to be stripped and finally they may be bent into a U-shaped configuration by bending means 130. For example, according to another illustrative embodiment, the electrical wires 11, 12 which are fed at the first feeding station 100 may be first bent into a U-shaped configuration by the bending means 130 and then one end of the electrical wires 11, 12 in the U-shaped configuration may pass through the stripping blades 120' to be stripped.

Moreover, even if the stripping means 120, the bending means 130, 310 and the asymmetric holder comb 500', 500" have been described in reference to the machine 1000, it is clear that they can be also employed in a different machine for producing hybrid electrical wiring.

Moreover, the number of machines located at each working station may be different from what is shown in the Figures. For example, even if it is shown that there are three feeding machines respectively at the first feeding station 100 and at the second feeding station 300, it is clear that they can be for example one, two, four, five or more.

For example, even if it is shown that there are three crimping machines at the crimping station 200, it is clear that they can be for example one, two, four, five or more.

For example, even if four holding and transfer means 500 are represented on the closed loop 800, it is clear that they can be for example one, two, three, five or more. Preferably, there are nine holding and transfer means 500 in the machine 1000.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of the elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A machine, comprising:
- a first feeding station configured to feed at least one electrical wire;
- a crimping station having at least one crimping tool, the crimping station is connected to the first feeding station by a track;
- an insulation displacement connection (IDC) connection station connected to the crimping station by the track; and
- a holding and transfer device that is movable along the track, the holding and transfer device having;
  - at least one actuator, the holding and transfer device configured to receive the at least one electrical wire from the first feeding station and transferring one or both ends of a first wire from the first feeding station to one or both of the crimping station and the IDC; and
  - a holder comb disposed on the holding and transfer device, the holder comb having:
    - a frame;
    - a plurality of seats disposed on the frame and sized so as to accommodate electrical wires; and
    - a temporary storage area, the temporary storage area includes two seats of the plurality of seats placed at a first distance, a spring is positioned between the two seats of the temporary storage area and a width between the two seats is dynamically adjusted by the spring when introducing the electrical wires into the two seats.

2. The machine according to claim 1, further comprising a second feeding station feeding additional electrical wires and positioned between the crimping station and the IDC connection station.

3. The machine according to claim 2, wherein the first feeding station includes a stripping device.

4. The machine according to claim 2, wherein at least one of the first feeding station or the second feeding station include at least one bending means adapted to bend the wires in U-shape configuration.

5. The machine according to claim 4, wherein the bending means comprises a guide rotatable around a pivot and mounted on a semi-circular jig that is coaxial with the pivot.

6. The machine according to claim 1, wherein the holder comb is an asymmetric holder comb.

7. The machine according to claim 1, wherein the holder comb includes a permanent storage area, the permanent storage area includes at least two seats placed at a second distance, the first distance is greater than the second distance.

8. The machine according to claim 7, wherein the at least two seats of the permanent storage area have predefined different widths.

9. A machine, comprising:
- a first feeding station configured to feed at least one electrical wire;
- a crimping station having at least one crimping tool, the crimping station is connected to the first feeding station by a track;
- an insulation displacement connection (IDC) connection station connected to the crimping station by the track;
- a holding and transfer device that is movable along the track and has at least one actuator, the holding and transfer device configured to receive the at least one electrical wire from the first feeding station and transferring one or both ends of a first wire from the feeding station to one or both of the crimping station and the IDC; and
- a second feeding station feeding additional electrical wires and positioned between the crimping station and the IDC connection station, the first feeding station and the second feeding station each include a bending device including a guide pivotably connected to a semi-circular jig, the guide receives the at least one electrical wire and is rotatable around the semi-circular jig to bend the at least one electrical wire around the semi-circular jig into a U-shaped configuration.

* * * * *